(12) United States Patent
Sun (10) Patent No.: US 8,936,541 B2
(45) Date of Patent: Jan. 20, 2015

(54) CHAIN-TYPE BIT-STORING APPARATUS

(71) Applicant: Chen Sound Industrial Co., Ltd., Taichung (TW)

(72) Inventor: Ying Sun, Taichung (TW)

(73) Assignee: Chen Sound Industrial Co., Ltd., Taichung (TW)

( * ) Notice: Subject to any disclaimer, the term of this patent is extended or adjusted under 35 U.S.C. 154(b) by 185 days.

(21) Appl. No.: 13/802,215

(22) Filed: Mar. 13, 2013

(65) Prior Publication Data

US 2014/0274626 A1 Sep. 18, 2014

(51) Int. Cl.
*B23Q 3/157* (2006.01)
*B23Q 3/00* (2006.01)
*B65G 1/12* (2006.01)
*B65G 17/40* (2006.01)
*B23Q 3/155* (2006.01)

(52) U.S. Cl.
CPC .............. *B23Q 3/00* (2013.01); *B23Q 3/15746* (2013.01); *B65G 1/12* (2013.01); *B65G 17/40* (2013.01); *B23Q 3/15526* (2013.01)
USPC ................... 483/68; 483/62; 483/3; 211/1.56

(58) Field of Classification Search
CPC ................................................. B23Q 3/15746
USPC .......................... 483/68, 62, 3; 211/1.56, 70.6
See application file for complete search history.

(56) References Cited

U.S. PATENT DOCUMENTS

| | | | | |
|---|---|---|---|---|
| 4,780,952 A | * | 11/1988 | Babel et al. | 483/68 |
| 5,554,087 A | * | 9/1996 | Hwang et al. | 483/62 |
| 7,575,543 B1 | * | 8/2009 | Sun et al. | 483/68 |
| 8,632,447 B2 | * | 1/2014 | Sun | 483/68 |

FOREIGN PATENT DOCUMENTS

| | | | | |
|---|---|---|---|---|
| JP | 61-136750 A | * | 6/1986 | |
| JP | 61-168443 A | * | 7/1986 | |
| JP | 61-168445 A | * | 7/1986 | |
| JP | 63-007426 U | * | 1/1988 | |
| JP | 2001-259951 A | * | 9/2001 | |
| JP | 2004-160595 A | * | 6/2004 | |

* cited by examiner

*Primary Examiner* — Erica E Cadugan (57) ABSTRACT

A machine tool is provided with a chain-type bit-storing apparatus which includes a frame, two sprockets, a chain and a pivoting unit. The frame includes a cutout. The sprockets are placed in the frame. The chain is driven by the sprockets. The chain includes links each including a socket for containing a bit, two plates for supporting the socket, first and second blocks placed between the plates, first and second bearing units for rotationally supporting the first and second blocks on the plates, and a connecting unit for pivotally connecting the first block thereof to the second block of an adjacent link. The pivoting unit is used to pivot the socket of a selected one of the links to move an open end of the socket out of the frame through the cutout.

19 Claims, 10 Drawing Sheets

CHAIN-TYPE BIT-STORING APPARATUS

BACKGROUND OF INVENTION

1. Field of Invention

The present invention relates to a machine tool and, more particularly, to a chain-type bit-storing apparatus for a machine tool.

2. Related Prior Art

A conventional chain-type bit-storing apparatus includes sprockets, a chain and a pivoting unit. The chain includes links. Each of the links includes a frame, a rotator, a pin and a socket. The rotator is rotationally connected to the frame. The pin is used to pivotally connect the frame to the rotator of another link. The socket, which is used for receiving a bit, is connected to the frame. The pivoting unit is used to pivot a selected one of the links, thus pivoting a selected one of the bits. The pivoting unit includes a guiding element and a pivoting element. The guiding element includes an arched track extending by and along an arched groove. The pivoting element includes an arched track extending by and along an arched groove. The arched track of the guiding element is movably placed in the arched groove of the pivoting element while the arched track of the pivoting element is movably placed in the arched groove of the guiding element. The pivoting element can be engaged with the selected link. Thus, the selected link is pivoted as the pivoting element is pivoted on the guiding element. However, the use of the conventional chain-type bit-storing apparatus is not without any problem. For example, it involves a complicated structure and therefore a high cost of manufacturing. Moreover, it requires high power to drive the pivoting element on the guiding element because of large friction between them and therefore involves a high cost of use and produces loud noise. In addition, the consumption of high power requires a large power system that renders an entire machine tool bulky.

Therefore, the present invention is intended to obviate or at least alleviate the problems encountered in prior art.

SUMMARY OF INVENTION

It is the primary objective of the present invention to provide a machine tool with an inexpensive, efficient and compact chain-type bit-storing apparatus.

To achieve the foregoing objective, the chain-type bit-storing apparatus includes a frame, two sprockets, a chain and a pivoting unit. The frame includes a cutout. The sprockets are placed in the frame. The chain is driven by the sprockets. The chain includes links each including a socket for containing a bit, two plates for supporting the socket, first and second blocks placed between the plates, first and second bearing units for rotationally supporting the first and second blocks on the plates, and a connecting unit for pivotally connecting the first block thereof to the second block of an adjacent link. The pivoting unit is used to pivot the socket of a selected one of the links to move an open end of the socket out of the frame through the cutout.

Other objectives, advantages and features of the present invention will be apparent from the following description referring to the attached drawings.

BRIEF DESCRIPTION OF DRAWINGS

The present invention will be described through detailed illustration of the preferred embodiment referring to the drawings wherein.

DETAILED DESCRIPTION OF PREFERRED EMBODIMENT

Figure 1:
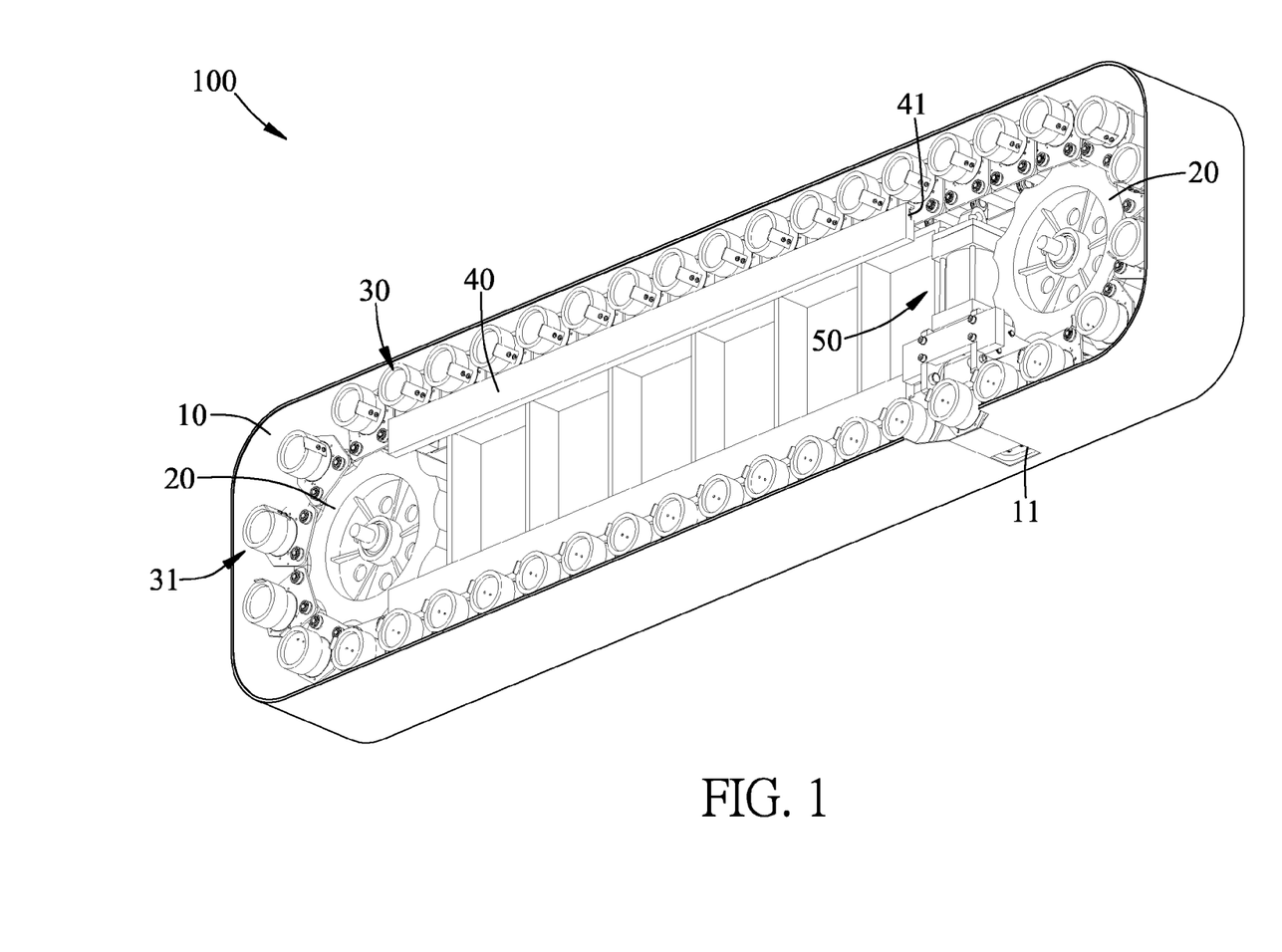
FIG. 1 is a perspective view of a chain-type bit-storing apparatus according to the preferred embodiment of the present invention.

Referring to FIG. 1, a chain-type bit-storing apparatus 100 includes a frame 10, two sprockets 20, a chain 30, a track 40 and a pivoting unit 50 according to the preferred embodiment of the present invention. The frame 10 includes a substantially oval configuration with a cutout 11 defined therein. The sprockets 20 are placed in the frame 10. The chain 30 is engaged with and driven by the sprockets 20.

Referring to FIGS. 1 through 6, the chain 30 includes links 31 connected to one another so that the chain 30 becomes a loop. Each of the links 31 includes a socket 32, two plates 33, two blocks 34, four bearing units 35, a connecting unit 36 and at least six restraining units.

Figure 2:
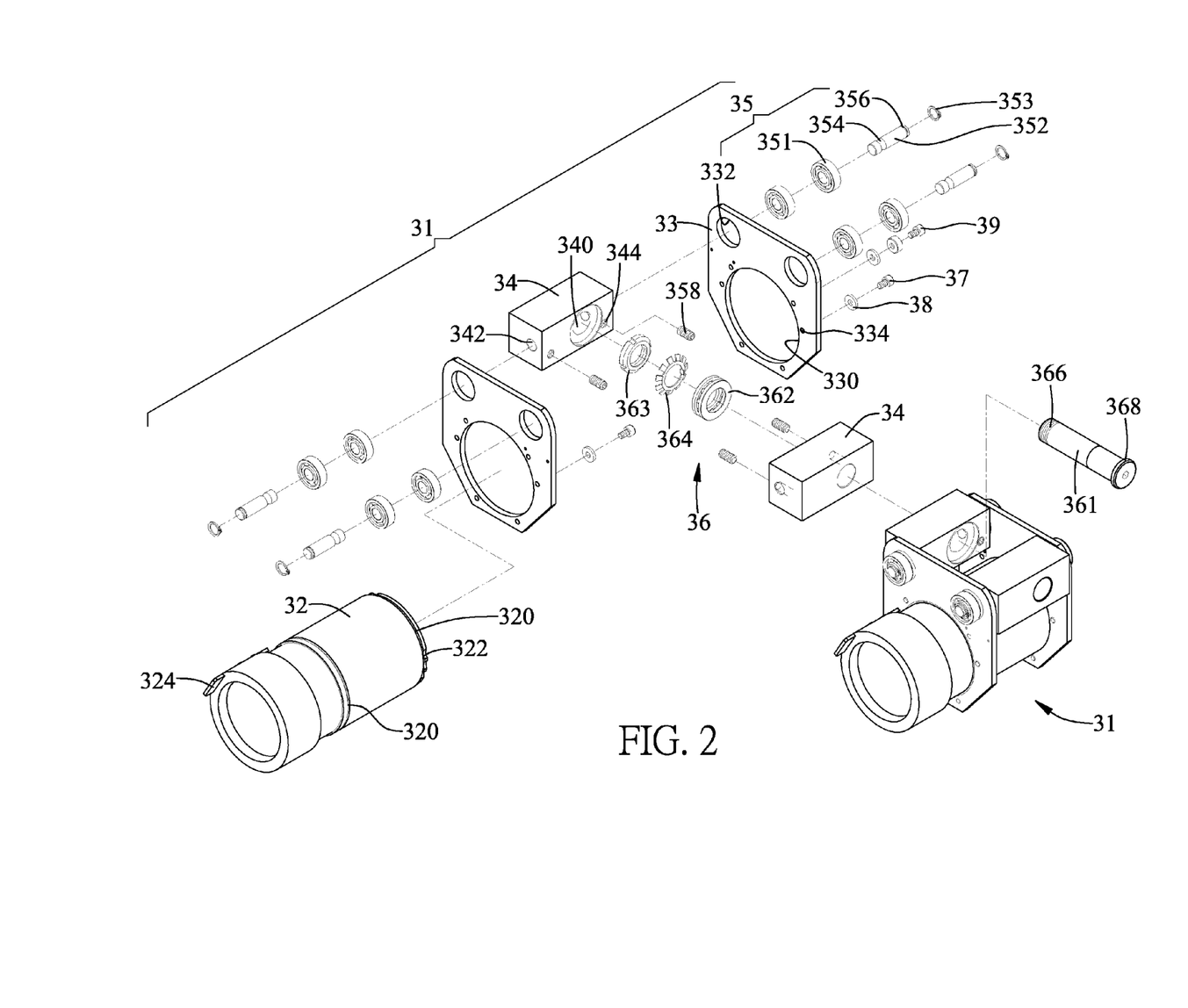
FIG. 2 is an exploded view of two links of a chain of the chain-type bit-storing apparatus shown in FIG. 1.
Figure 3:
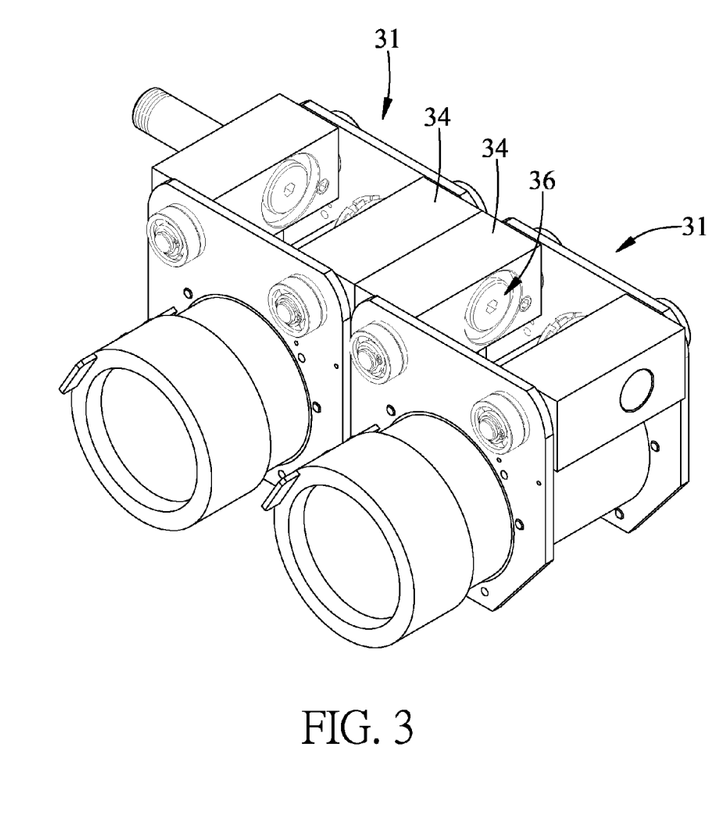
FIG. 3 is a perspective view of the links shown in FIG. 2.
Figure 4:
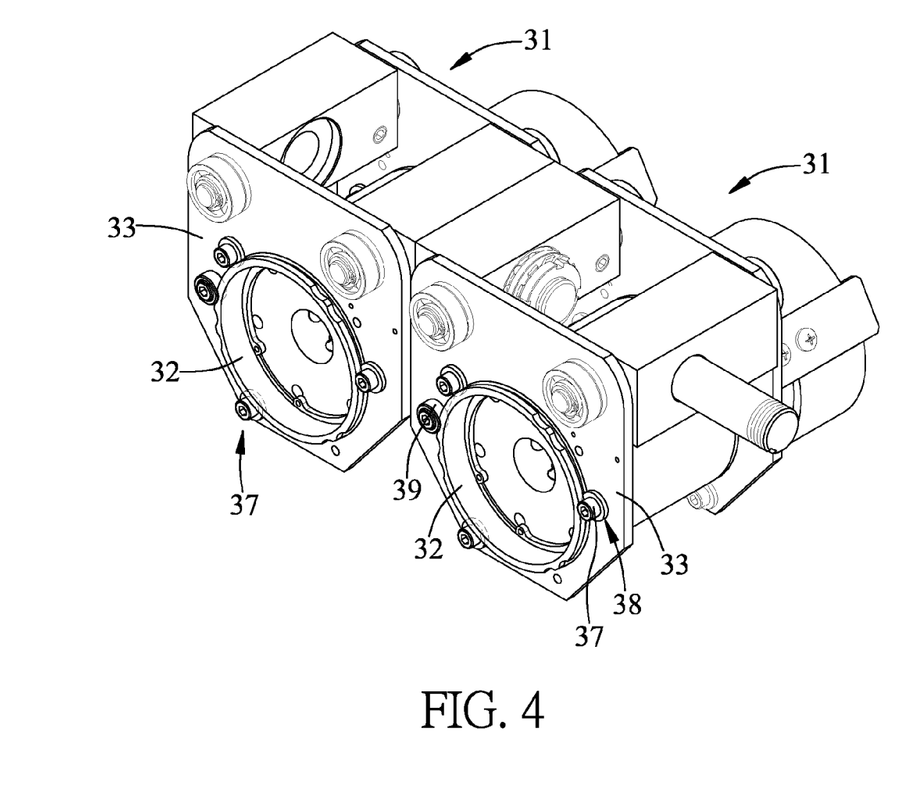
FIG. 4 is another perspective view of the links shown in FIG. 3.

The socket 32 is used to contain a bit. The socket 32 includes an open end through which the bit is inserted therein. The socket 32 includes two annular grooves 320 defined in the periphery thereof and six recesses 322 defined in the periphery at an end. An index element 324 is attached to another end of the socket 32.

Each of the plates 33 includes an opening 330, two apertures 332 and at least three screw holes 334. The opening 330, two apertures 332 and the screw holes 334 are circular. The centers of the screw holes 334 are at identical distances from the center of the opening 330.

Figure 5:
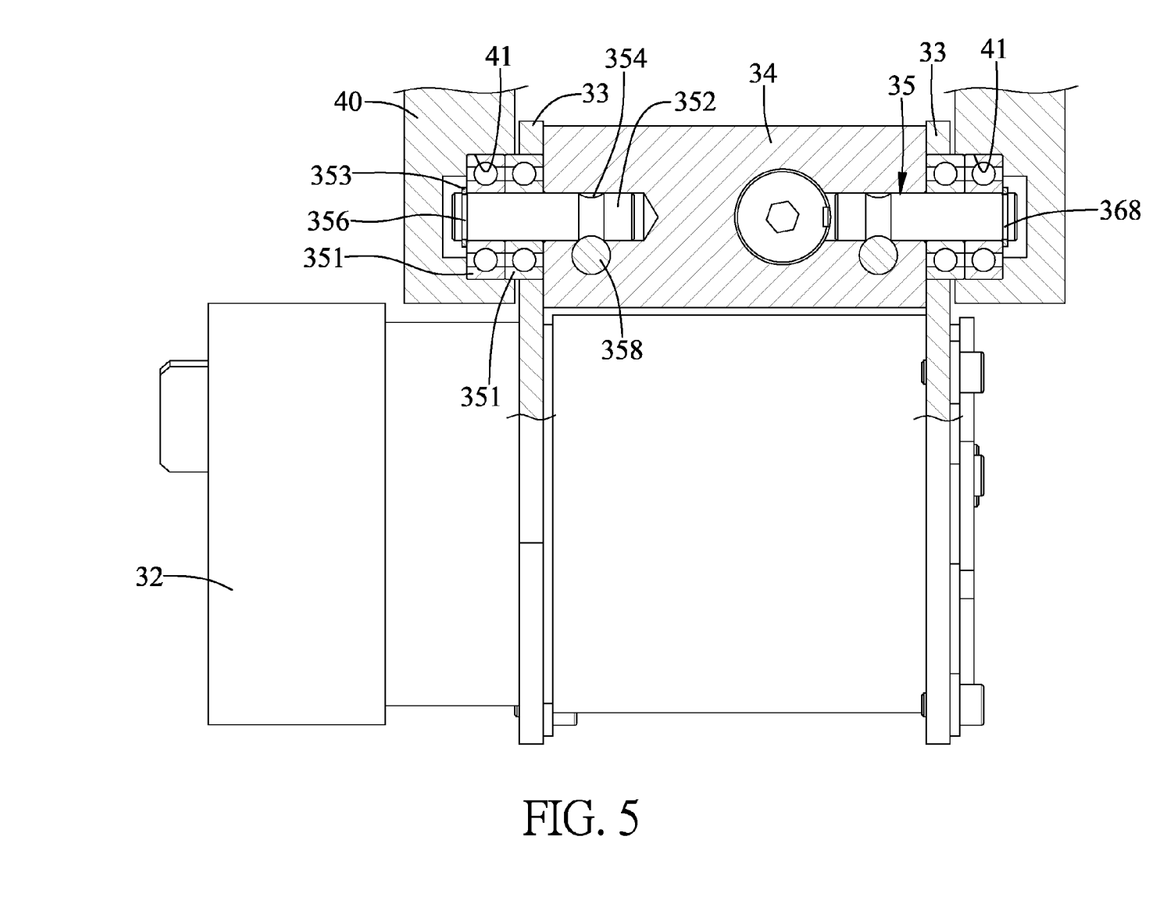
FIG. 5 is a cross-sectional view of the links shown in FIG. 4.
Figure 6:
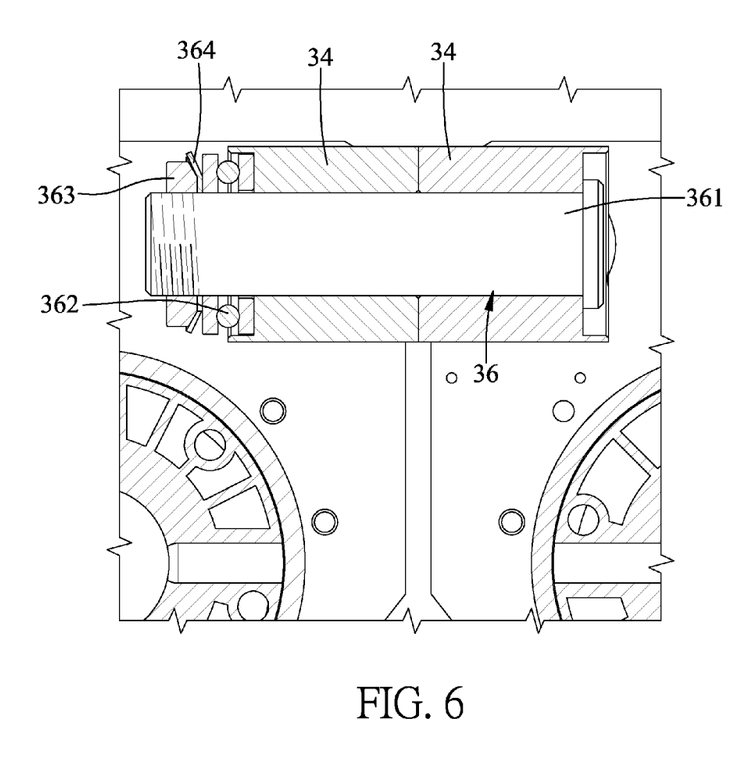
FIG. 6 is another cross-sectional view of the links shown in FIG. 4.

Referring to FIGS. 2, 5 and 6, each of the blocks 34 includes a countersink 340, two bores 342 and two screw holes 344. The axis of the countersink 340 extends perpendicular to the common axis of the bores 342. Each of the bores 342 is in communication with a corresponding one of the screw holes 344.

Referring to FIGS. 2 and 5, each of the bearing units 35 includes at least one bearing 351, a pivot 352 and a C-clip 353. The pivot 352 includes two annular grooves 354 and 356 defined in the periphery.

Referring to FIGS. 2 and 6, the connecting unit 36 includes a threaded bolt 361, a bearing 362, a nut 363 and an elastic washer 364. The threaded bolt 361 includes a thread 366 form on the periphery near a first end and a head 368 formed at a second end.

Each of the restraining units includes a restraining element 38. In the preferred embodiment, the restraining elements 38 are washers used together with an identical number of screws 37. However, in another embodiment, the six restraining units may be replaced with two C-clips or O-rings.

In assembly, the socket 32 is inserted through the openings 330 of the plates 33 so that the socket 32 is supported on the plates 33. Three of the restraining elements 38 are placed in one of the annular grooves 320 of the socket 32 while the other restraining elements 38 are placed in the other annular groove 320 of the socket 32. Each of the screws 37 is driven in a corresponding one of the screw holes 334 of a corresponding one of the plates 33 through a corresponding one of the restraining elements 38. Thus, the socket 32 is kept on the plates 33.

Another screw 39 is driven in one of the plates 33. The head of the screw 39 is placed in a selected one of the recesses 322, thus positioning the index element 324 in a selected one of six angles corresponding to the recesses 232.

The blocks 34 are placed between the plates 33. A second end of the pivot 352 of each bearing unit 35 is inserted in a corresponding bore 342 of a corresponding block 34. The pivot 352 of each bearing unit 35 is supported on the bearing 351 that is fit in a corresponding aperture 332 of a corresponding plate 33. A screw 358 is inserted in the annular groove 354 of the pivot 352 of each bearing unit 35 through a corresponding screw hole 344 of a corresponding block 34. The clip 353 of each bearing unit 35 is placed in the annular groove 356 of the pivot 352. Thus, the blocks 34 are pivotally connected to the plates 33 by the bearing units 35.

The bearing 362 is fit in the countersink 340 of the first block 34. The threaded bolt 361 is inserted through the bearing 362, the countersink 340 of the first block 34 of each link 31 and the countersink 340 of the second block 34 of an adjacent link 31. The nut 363 is engaged with the thread 366 of the threaded bolt 361. The resilient washer 364 is sandwiched between the bearing 362 and the nut 363. The head 368 of the threaded bolt 361 is placed against the adjacent link 31. Thus, the links 34 are pivotally connected to one another.

The track 40 is placed in the frame 10 between the sprockets 20. The track 40 includes two grooves 41 each for receiving a group of the links 31 of the chain 30.

Referring to FIGS. 7 through 10, the pivoting unit 50 includes a driving element 51, a pivoting element 52 and a guiding element 53. The driving element 51 is a hydraulic cylinder that includes an extensible rod 510.

Figure 7:
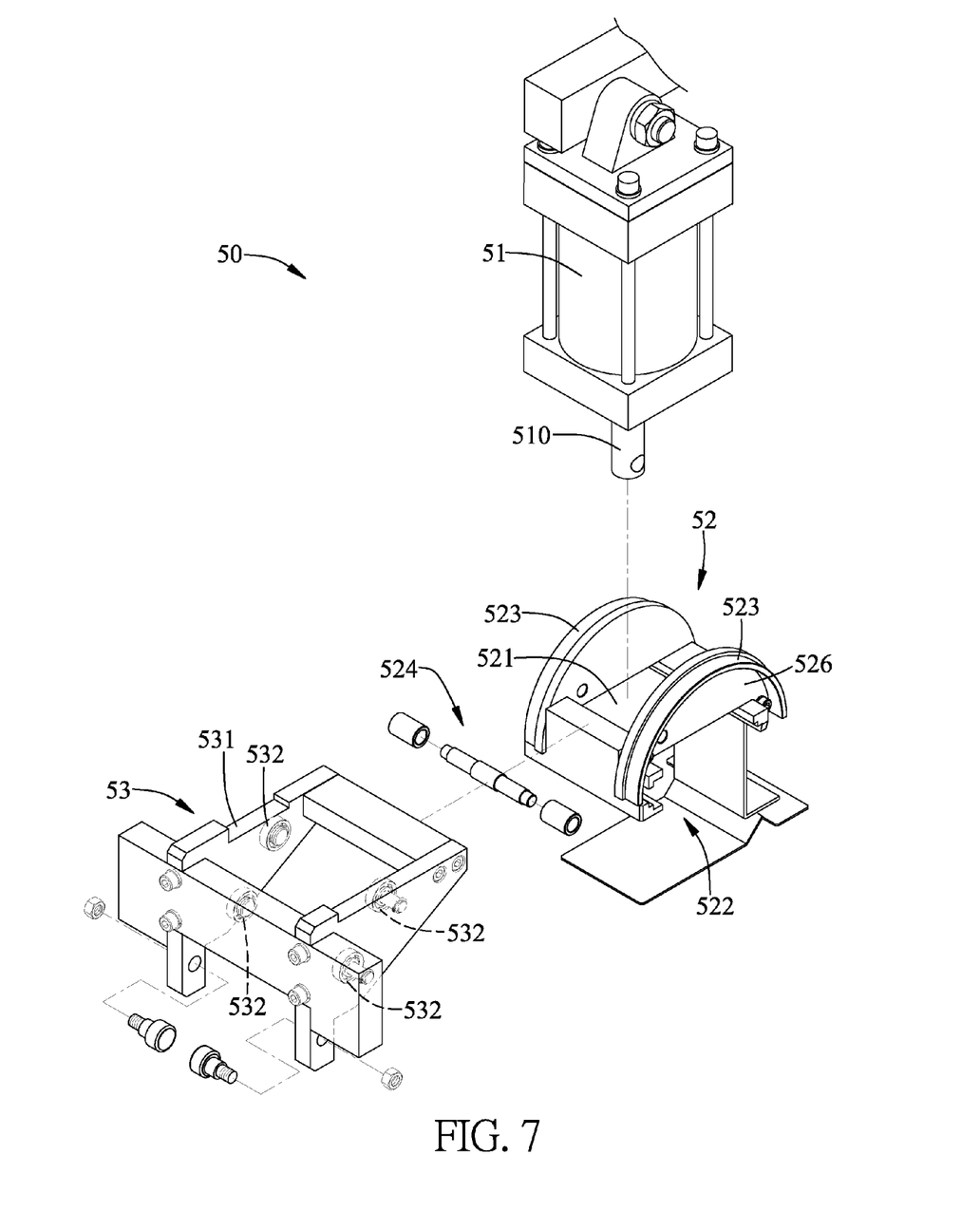
FIG. 7 is an exploded view of a pivoting unit of the chain-type bit-storing apparatus shown in FIG. 1.

The guiding element 53 includes two fins 531 and two groups of three rollers 532. Each group of rollers 532 is connected to a corresponding fin 531. In each group, the middle roller 532 is placed in a circle while the other rollers 532 are placed outside the circle.

The pivoting element 52 includes a U-shaped body 521, two fins 526, two arched flanges 523 and a pin 524. The U-shaped body 521 defines a space 522. The U-shaped body 521 is connected to the frame 10 near the cutout 11. Each of the fins 526 includes an arched edge. Each of the arched flanges 523 extends along the arched edge of a corresponding one of the fins 526.

Figure 8:
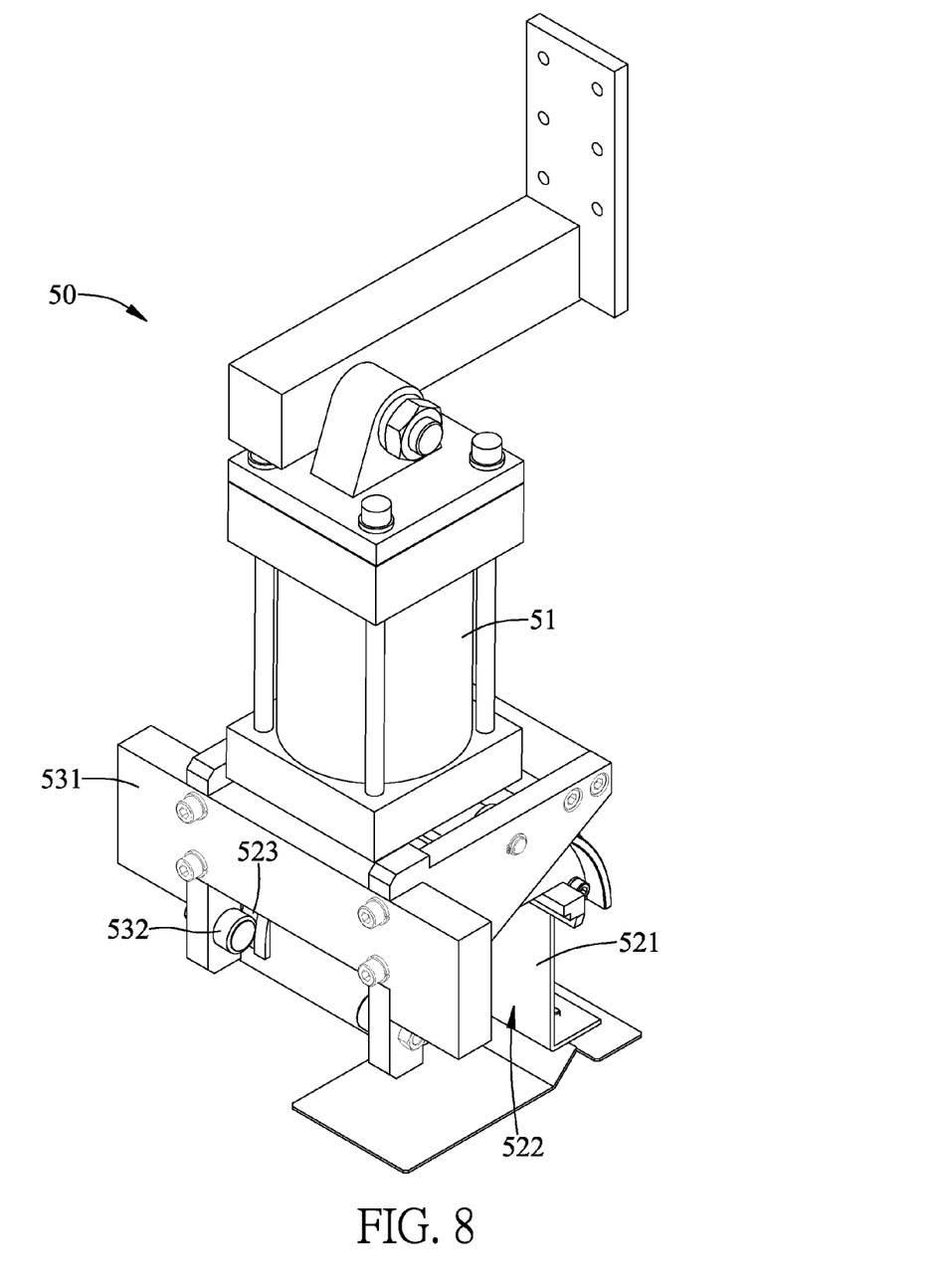
FIG. 8 is a perspective view of the pivoting unit of the chain-type bit-storing apparatus shown in FIG. 1.

In assembly, the guiding element 53 is connected to the driving element 51. Each arched flange 523 is engaged with a corresponding group of rollers 532. The middle roller 532 of each group is placed against an internal side of the corresponding arched flange 523 and the other rollers 532 are placed against an external side of the corresponding arched flange 523. Thus, the pivoting element 52 is pivotally connected to the guiding element 53. The pin 524 is inserted in the fins 526 and the extensible rod 510. Thus, the pivoting element 52 is operatively connected to the driving element 51.

Figure 9:
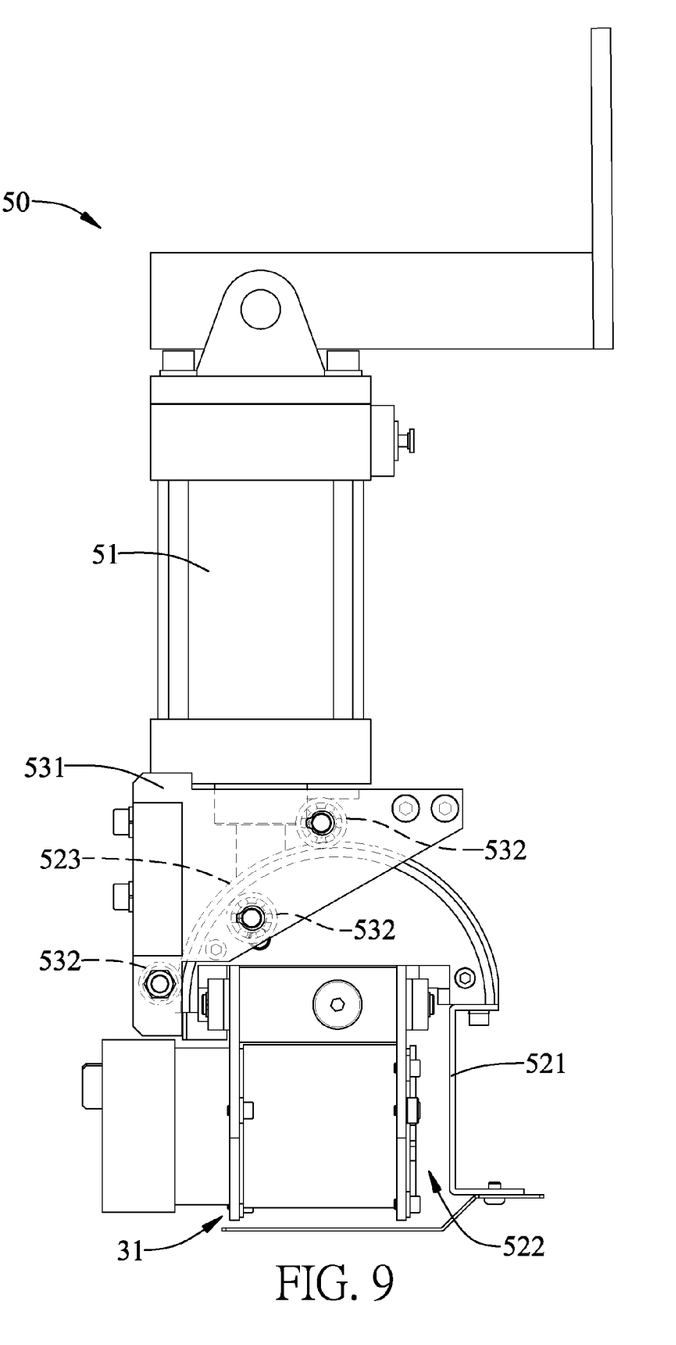
FIG. 9 is a side view of the pivoting unit of the chain-type bit-storing apparatus shown in FIG. 8.
Figure 10:
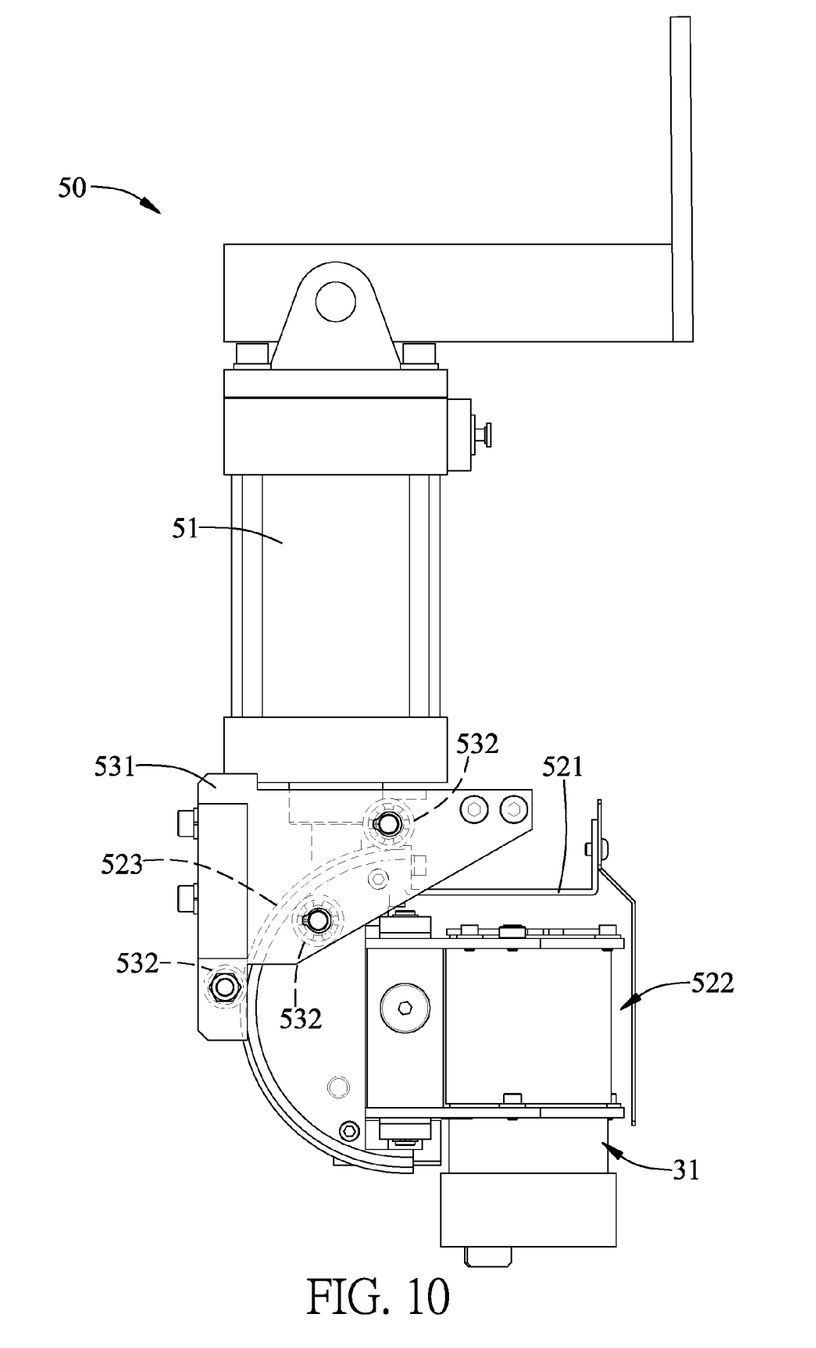
FIG. 10 is a side view of the pivoting unit of the chain-type bit-storing apparatus in another position than shown in FIG. 9.

Referring to FIGS. 1, 9 and 10, the chain 30 is driven by the sprockets 20. The sprockets 20 are stopped when a selected one of the links 31 is placed in the space 522 of the U-shaped body 521, which is placed in the vicinity of the cutout 11. The driving element 51 is turned on to pivot the selected link 31. Thus, the open end of the socket 32 of the selected link 31 is placed outside the frame 10 through the cutout 11. Now, a bit can be inserted in or removed from the socket 32 of the selected link 31.

The present invention has been described through the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A chain-type bit-storing apparatus including:
   a frame including a cutout;
   two sprockets placed in the frame;
   a chain driven by the sprockets and formed with links, each link including:
      a socket for containing a bit,
      two plates for supporting the socket of the respective link,
      two blocks placed between the plates,
      two bearing units for rotationally supporting each of the blocks on the plates for relative rotation of the respective block and the plates of the respective link, and
      a connecting unit for pivotally connecting one of the blocks of the respective link to one of the blocks of an adjacent one of the links for enabling pivoting of the respective link relative to the adjacent one of the links about a pivot axis; and
   the chain-type bit-storing apparatus further including:
   a pivoting unit for pivoting the socket of a selected one of the links about the pivot axis to move an open end of the socket of the selected link out of the frame through the cutout.

2. The chain-type bit-storing apparatus according to claim 1, including a track placed in the frame between the sprockets and formed with a groove for receiving a corresponding portion of the chain.

3. The chain-type bit-storing apparatus according to claim 1, wherein each of the links includes at least one restraining unit for keeping the socket of the respective link on the plates of the respective link.

4. The chain-type bit-storing apparatus according to claim 3, wherein each of the sockets includes at least one annular groove for receiving the respective at least one restraining unit.

5. The chain-type bit-storing apparatus according to claim 4, wherein the at least one restraining unit of each link includes a washer placed in the respective at least one annular groove, and also includes a screw for securing the washer to the corresponding plate.

6. The chain-type bit-storing apparatus according to claim 1, wherein each of the bearing units includes two bearings and at least one pivot inserted in the corresponding block through the bearings.

7. The chain-type bit-storing apparatus according to claim 1, wherein the two blocks of each of the links contact the plates of the respective link.

8. The chain-type bit-storing apparatus according to claim 1, wherein each of the bearing units includes a bearing supported on a corresponding one of the plates and a pivot inserted in the corresponding block through a corresponding one of the bearings.

9. The chain-type bit-storing apparatus according to claim 8, wherein each of the bearing units includes a screw driven in the corresponding block, wherein the pivot of the respective bearing unit includes an annular groove for receiving a portion of the respective screw so that the pivot of the respective bearing unit is kept in the corresponding block by the corresponding screw.

10. The chain-type bit-storing apparatus according to claim 9, wherein each of the bearing units includes a C-clip fit on the pivot of the respective bearing unit and placed against the corresponding plate.

11. The chain-type bit-storing apparatus according to claim 10, wherein each of the pivots includes another respective annular groove for receiving the respective C-clip.

12. The chain-type bit-storing apparatus according to claim 1, wherein each of the connecting units includes a threaded bolt inserted in the one of the blocks of the respective link and the one of the blocks of the adjacent link.

13. The chain-type bit-storing apparatus according to claim 12, wherein each of the connecting units includes a nut engaged with the respective threaded bolt and placed against the one of the blocks of the respective link, wherein the respective threaded bolt includes a head placed against the one of the blocks of the adjacent link.

14. The chain-type bit-storing apparatus according to claim 13, wherein each of the connecting units includes a bearing between the respective threaded bolt and one of the blocks connected by the connecting unit.

15. The chain-type bit-storing apparatus according to claim 14, wherein each of the connecting units includes a resilient washer sandwiched between the respective bearing and the respective nut.

16. The chain-type bit-storing apparatus according to claim 1, wherein the pivoting unit includes a driving element connected to the frame, a pivoting element connected to the driving element and used to receive the selected link, and a guiding element for pivotally supporting the pivoting element in the frame.

17. A chain-type bit-storing apparatus including:
a frame including a cutout;
two sprockets placed in the frame;
a chain driven by the sprockets, wherein the chain includes links connected to one another so that the chain becomes a loop, wherein each of the links includes a respective socket for receiving a respective bit and can be pivoted about an axis that is in a plane defined by the loop independent of the other links; and
a pivoting unit for pivoting the socket of a selected one of the links to move an open end of the socket of the selected one of the links out of the frame through the cutout, wherein the pivoting unit includes a driving element connected to the frame, a pivoting element connected to the driving element and used to receive the selected link, and a guiding element for pivotally supporting and guiding the pivoting element in the frame, and
wherein the pivoting element includes at least one arched flange, wherein the guiding element includes at least one roller in contact with a side of the at least one arched flange and at least two more rollers in contact with an opposite side of the at least one arched flange.

18. The chain-type bit-storing apparatus according to claim 17, wherein the pivoting unit includes a pin connected to the pivoting element, wherein the driving element includes an extensible rod connected to the pin.

19. The chain-type bit-storing apparatus according to claim 17, wherein the pivoting element includes at least one fin, wherein the at least one arched flange extends from a side of the at least one fin, wherein the guiding element includes at least one fin, and wherein the rollers are supported on the at least one fin of the guiding element.

* * * * *